(12) United States Patent
Telschow et al.

(10) Patent No.: US 6,175,411 B1
(45) Date of Patent: *Jan. 16, 2001

(54) APPARATUS AND METHOD FOR MEASURING AND IMAGING TRAVELING WAVES

(75) Inventors: Kenneth L. Telschow; Vance A. Deason, both of Idaho Falls, ID (US)

(73) Assignee: Bechtel BWXT Idaho, LLC, Idaho Falls, ID (US)

( * ) Notice: Under 35 U.S.C. 154(b), the term of this patent shall be extended for 0 days.

This patent is subject to a terminal disclaimer.

(21) Appl. No.: 09/112,075

(22) Filed: Jul. 8, 1998

Related U.S. Application Data (63) Continuation-in-part of application No. 09/031,613, filed on Feb. 25, 1998, now Pat. No. 6,134,006.

(51) Int. Cl.[7] ............................................... G01B 11/02
(52) U.S. Cl. .................................................. 356/357
(58) Field of Search ................................... 356/349, 345, 356/432

(56) References Cited

U.S. PATENT DOCUMENTS 5,131,748 * 7/1992 Monchalin et al. .................. 356/349

* cited by examiner

Primary Examiner—Robert Kim
Assistant Examiner—Andrew H. Lee
(74) Attorney, Agent, or Firm—Wells St. John Roberts Gregory & Matkin (57) ABSTRACT

An apparatus is provided for imaging traveling waves in a medium. The apparatus includes a vibration excitation source configured to impart traveling waves within a medium. An emitter is configured to produce two or more wavefronts, at least one wavefront modulated by a vibrating medium. A modulator is configured to modulate another wavefront in synchronization with the vibrating medium. A sensing media is configured to receive in combination the modulated one wavefront and the another wavefront and having a detection resolution within a limited bandwidth. The another wavefront is modulated at a frequency such that a difference frequency between the one wavefront and the another wavefront is within a response range of the sensing media. Such modulation produces an image of the vibrating medium having an output intensity that is substantially linear with small physical variations within the vibrating medium for all vibration frequencies above the sensing media's response bandwidth. A detector is configured to detect an image of traveling waves in the vibrating medium resulting from interference between the modulated one wavefront and the another wavefront when combined in association with the sensing media. The traveling wave can be used to characterize certain material properties of the medium. Furthermore, a method is provided for imaging and characterizing material properties according to the apparatus.

32 Claims, 7 Drawing Sheets

APPARATUS AND METHOD FOR MEASURING AND IMAGING TRAVELING WAVES

RELATED APPLICATION

This is a continuation-in-part of co-pending U.S. application Ser. No. 09/031,613, which was filed Feb. 25, 1998.

CONTRACTUAL ORIGIN OF THE INVENTION

The United States has rights in this invention pursuant to Contract No. DE-AC07-94ID13223 between the U.S. Department of Energy and Lockheed Martin Idaho Technologies Company.

TECHNICAL FIELD

This invention relates generally to apparatus and methods for characterizing material behavior, and more particularly to imaging of surface displacement of a traveling wave along a surface corresponding to a propagation wavefront extending along orthogonal directions within a plane.

BACKGROUND OF THE INVENTION

There exist a variety of techniques for detecting properties of materials. However, generally these techniques are limited to detection at discrete points within a material and require timely and sometimes destructive evaluation of a material. Such analysis is further compounded when materials contain anisotropic properties. Therefore, there exists a need to evaluate the characteristics and properties of materials such as solids, liquids and gases to determine directional variations in such properties. For example, there exists a need to determine anisotropic properties within solid material plates or sheets such as in sheet metal and paper products.

One technique involves the monitoring of traveling elastic waves as they pass through a material. Such waves will vary in speed in proportion to changes in material properties, giving an indication of such properties. For example, pulsed holographic recording has been used to a limited extent to image synchronized traveling elastic wave motion. Another technique is Schlieren photography which has been used to image synchronized traveling elastic wave motion in optically transparent and diffracting media. However, such technique is limited to detecting traveling wave motion within only optically transparent and diffracting media. Yet another technique involves electronic speckle pattern interferometry (ESPI) which is used to image large motions. Such technique is commercially available. However, the image processing is relatively complex since it requires external post processing for extraction of the measurement information.

One technique for implementing ultrasonic non-destructive evaluation of materials involves testing a plate or sheet of material with an emitter and a detector. The emitter, a contact piezoelectric device, is positioned relative to the detector to measure travel velocity, or elastic wave speed, along a specific direction in a material extending between the emitter and detector. The emitter is positioned at a central location against the material, and the detector is placed at one of a plurality of discrete locations along a circle extending about the emitter. Measurements are taken at each discrete location by moving the detector to each location, and travel time is calculated to determine the velocity in each direction. Accordingly, velocity differences in specific directions can be correlated with anisotropic material characteristics. For example, metal plates have been investigated in a water bath using an acoustic generator to determine travel velocity in a given direction at a point on the plate. An air coupled transducer or laser ultrasonics device enables non-contacting determination of anisotropy in materials. However, such point measurement techniques are slow and difficult to automate because the detector must be positioned or moved to each of a number of discrete locations about the emitter in order to detect travel speed along all directions in the material under test.

Another technique for implementing non-destructive evaluation of materials involves the use of a coherent laser to illuminate an object and form an interference pattern related to changes on the surface of the object. Variations include the use of holography, Electronic Speckle pattern Interferometry (ESPI) and Shearography. The interference pattern is then recorded with a camera such as a charge coupled device (CCD) camera. The resulting image is then recorded and processed to produce an image of the surface displacement. However, the minimum detectable displacements typically range from 10–100 nanometers. Furthermore, such techniques require the use of external image processing to produce a usable output.

While the above-described techniques have provided some degree of success, there exist several shortcomings needing resolution. For example, there exists a need to provide imaging of synchronous traveling wave motion at arbitrary frequencies within solids, gases or liquids such that material properties can be determined. There also exists a need to provide rapid full-field imaging of a traveling wave displacement amplitude simultaneous for all points extending over a material surface. Finally, there is a need for imaging travelling wave motion occurring at small ultrasonic displacements (e.g., less than one (1) nanometer in amplitude).

Therefore, it is desirable to provide an apparatus and method for imaging traveling wave motion within materials. It is furthermore desirable to extend such imaging in order to determine material properties that relate to the velocity that such waves travel through a material. Furthermore, there is a need to provide for such apparatus and method with a simplified design and implementation that enables quick, or rapid full-field view imaging, is relatively low-cost, and enables non-destructive imaging and material testing with high sensitivity.

One object of the present invention is to provide a vastly improved traveling wave imaging apparatus and method particularly suited for use with diffusely reflecting surfaces and having a greatly enhanced sensitivity, linear output for small vibration amplitudes (proportional to Bessel function of order one), while simultaneously providing a rapid full-field image of a traveling wave propagating over the surface of the specimen while enabling surface imaging and material property characterization.

SUMMARY OF THE INVENTION

An apparatus is provided for imaging traveling waves in a medium. The apparatus includes a vibration excitation source configured to impart traveling waves within a medium. An optical emitter is configured to produce two or more optical wavefronts, at least one wavefront modulated by a vibrating medium. A modulator is configured to modulate another wavefront in synchronization with the vibrating medium. A sensing media is configured to receive in combination the modulated one wavefront and the another wavefront and having a detection resolution within a limited bandwidth. The another wavefront is modulated at a frequency such that a difference frequency between the one wavefront and the another wavefront is within a response range of the sensing media. Such arrangement produces an image of the vibration having an intensity that is it substantially linear with small physical variations within the vibrating medium. A detector is configured to detect an image of traveling waves in the vibrating medium resulting from interference between the modulated one wavefront and the another wavefront when combined in association with the sensing media. Furthermore, a corresponding method is provided according to the invention.

BRIEF DESCRIPTION OF THE DRAWINGS

Preferred embodiments of the invention are described below with reference to the accompanying drawings, which are briefly described below.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

An apparatus and method are disclosed for detecting material properties by directly measuring and imaging ultrasonic traveling waves at the surface of a material. In one case, the measurements characterize the surface waves at the surface of the material for the purpose of measuring material properties through propagation characteristics of the waves. In another case, the measurements characterize traveling waves in solid material plates or sheets. In yet other cases, the measurements characterize acoustic traveling waves in gases or liquids, traveling waves on the surface of liquids, and traveling waves at the surface of solid materials that include Rayleigh, longitudinal and transverse wave modes within a solid.

For example, it may be desirable to detect and image acoustic traveling waves resulting from loudspeaker and transducer radiation, or from vibratory surface acoustic radiation. In other cases, it may be desirable to detect traveling waves on the surface of an ocean or a river. In even other cases, it may be desirable to detect traveling waves in solid material objects such as plates and sheets such as paper products and sheet metal objects. Observations of the pattern produced by propagation of traveling waves within a material can then be used to characterize material properties as they relate to the direction of travel of such traveling waves.

One way of characterizing material properties via observation of propagating traveling waves within a material entails observing/measuring the distance/travel speed of such waves as they propagate from a point of origin. Higher propagation speeds in certain directions can indicate non-uniformities within the material. For example, a solid material can be determined to have anisotropic material properties where propagation of such traveling waves from a single point of origin produces an elliptical wave pattern. Such elliptical wave pattern indicates a higher wave propagation speed extending in a direction along the major axis of the ellipse, and a lower wave propagation speed extending in a direction along the minor axis of the ellipse.

The apparatus and method of this invention utilizes an excitation scheme and a modulation scheme that are synchronized. The excitation scheme employs a laser, contact piezoelectric, acoustic, electrostatic, magnetic, ultrasonic, or other amplitude modulating and displacement-inducing source that is capable of generating a synchronized traveling wave pattern in a material.

The modulation scheme utilizes a source of coherent light that is split into two beams, an object beam and a reference beam. The object beam is reflected off the vibrating surface, where it is phase modulated by the vibrating surface at the mechanical vibration frequency and phase. The reference beam is optically phase modulated by suitable electrical, acoustical, magnetic or other optical means, at a fixed modulation depth is and frequency that is substantially a fixed difference from the vibration frequency that is to be measured. The modulated object and reference beams are interfered inside a photorefractive material, producing a three-dimensional interference pattern. This interference pattern forms a volume hologram by inducing a space charge electric field distribution. Such distribution produces, through electro-optic effects, an index of refraction volume hologram or Bragg grating in direct correspondence with the specimen vibration displacement amplitude and phase. The index of refraction volume grating varies at a fixed difference frequency between the object frequency and the modulated reference frequency. Since the index of refraction volume grating is produced by interfering beams whose frequencies may vary, while the difference between the frequencies is maintained fixed, the grating is always of usable spatial and temporal form within the photorefractive material for all object vibration frequencies above the photorefractive response cutoff frequency.

Either four-wave or two-wave coupling methods can be used to read the induced grating, producing an output beam whose intensity is a function of the specimen vibration mechanical displacement and mechanical phase. Anisotropic self-diffraction, with or without polarization rotation, within the photorefractive material is one of the possible mechanisms that can be used to provide high optical throughput and selectivity for the vibration signal component of the output beam. This vibration component of the output beam consists of a product of the zero and first order Bessel functions of the object vibration displacement amplitude all multiplied by the cosine of the phase difference between the object and reference beam modulations. This implementation produces an output that is linear in the vibration displacement amplitude for amplitudes that are small compared with the optical wavelength.

In this manner, a vibration spectrum detector is produced that can record an image of traveling waves simultaneously over the entire surface of the object without the need for scanning of a point measurement beam. Such simultaneous traveling waves can be viewed over the entire surface of the object, which enables determination of variations in wave traveling velocity. Such variations of wave velocity can be correlated with variations in material properties along corresponding directions of the material within the surface.

It is to be understood that the object beam comprises an object wavefront and the reference beam comprises a reference wavefront. Accordingly, the object wavefront and the reference wavefront cooperate to enable production of an image of a vibrating medium extending in at least two dimensions. According to one implementation detailed below, a beam expander enables generation of a sufficiently expanded object wavefront from the object beam.

Details of one related art apparatus and method for measuring displacement amplitude and phase of vibrating surfaces involving a four-wave mixing optical lock-in method are disclosed in Applicant's Provisional Application Ser. No. 60/039,171, which was filed on Feb. 26, 1997, and in Applicant's related U.S. patent application Ser. No. 08/787,073, which was filed on Jan. 22, 1997. Applicant's Provisional Application Ser. No. 60/039,171 and U.S. patent application Ser. No. 08/787,073 are herein incorporated by reference.

Details of another related art apparatus and method for imaging photorefractive optical vibration are disclosed in Applicant's U.S. patent application Ser. No. 09/031,613, which was filed on Feb. 25, 1998. Applicant's U.S. patent application Ser. No. 09/0314,613 is herein incorporated by reference.

Figure 1:
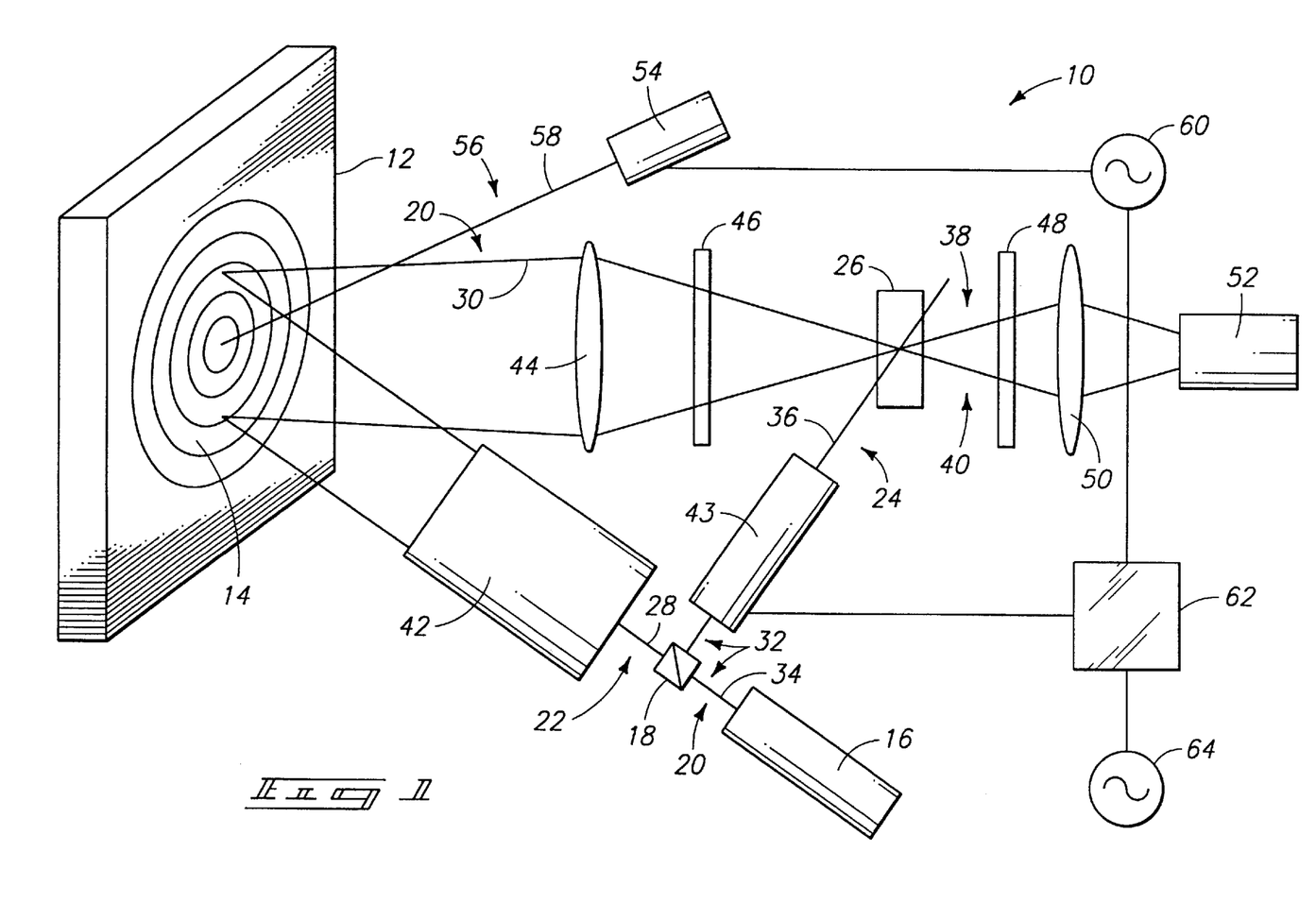
FIG. 1 is a simplified diagrammatic view of a preferred embodiment of the invention illustrating an apparatus for characterizing material properties and imaging synchronous traveling wave motion within a material such as a solid, liquid or gas.

A preferred embodiment of the invention is illustrated in the accompanying drawings particularly showing an apparatus for measuring and imaging synchronous traveling waves within an object of interest generally designated with the numeral 10 in FIG. 1. According to one characterization, such apparatus 10 comprises a vibration imaging device, or traveling wave spectrum analyzer, capable of imaging traveling waves in a medium. According to another characterization, such apparatus 10 comprises a surface displacement imaging device. According to yet another characterization, such apparatus 10 comprises a device for generating an image of traveling waves and characterizing material properties based upon the imaged traveling waves.

In one implementation, such invention uses a two-wave mixing configuration for reading out a vibration-induced phase grating image, a which may include the use of anisotropic self-diffraction, with or without polarization rotation, to improve the signal to noise ratio. Improved sensitivity is provided for diffusely reflecting surfaces, providing a greatly enhanced optical throughput compared to a four-wave method. It is understood that the object of interest 12 may be all manner of gas, liquid or solid and the vibration to be detected includes the acoustic or ultrasonic motion of the gas, liquid or solid.

It is also understood that implementation of the apparatus comprises a method for detecting and imaging traveling waves in an object of interest according to another aspect of this invention. According to one implementation, the invention comprises a method for characterizing traveling waves generated in/on an object of interest. More particularly, the invention comprises a method for generating, characterizing and/or imaging periodic physical variations in an object of interest capable of indicating material properties within the object of interest.

Accordingly, a direct measurement and image of ultrasonic traveling waves can be produced according to this invention. More particularly, such imaged traveling waves enable characterization and measurement of material properties through which the waves are traveling. A photorefractive vibration spectral analysis method as described herein is incorporated with synchronized vibration generation with a medium to produce images of surface displacement of traveling waves extending through the medium. In one form, the medium comprises the surface of a solid object.

As a result, a picture of a propagating wavefront can be generated in orthogonal directions within an object. The presence of anisotropic material properties can be readily shown in the form of a resulting elliptical wave pattern that can be observed in the image. Such observation yields quantitative measurement of wave velocity, amplitude and attenuation, correlated with specific directions of propagation.

Data from ultrasonic images can be inverted, via a Fourier transformation, to yield quantitative material elastic, microstructural and dimensional properties from a rapid full-field view image of such propagating waves. According to such implementation, it is not required to scan a region in order to cover a large area. Such implementation differs from prior art implementations in that measurement and imaging of traveling waves can be performed quickly and efficiently. In contrast, prior art techniques have required the use of resonant mode vibrations, which complicates analysis and data collection.

Accordingly, the significant features of this invention entail the use of photorefractive materials for optical processing which replaces conventional interferometry apparatus. Additionally, such novelty entails employing synchronous optical detection in a manner that provides an image of a vibration displacement amplitude extending over the surface of a material on which an ultrasonic wave is traveling. Furthermore, such technique entails using an implementation that utilizes optical interference inside photorefractive materials to provide an output beam intensity that is directly proportional to a traveling wave displacement amplitude. Such output beam intensity extends over all points on a material surface, and is produced simultaneously, eliminating the need for producing optical interference at an image plane of an optical detector. For example, such need is required to be produced via a charge coupled device (CCD) camera in the prior art. Even furthermore, such technique entails imaging traveling waves on surfaces in a manner that does not require resonant modes or boundary reflections. Finally, such technique can be implemented with synchronous traveling wave applications extending in any of a number of medium, including wave transmission of acoustics in gases and liquids, as well as ultrasonic motion on surfaces of objects.

As shown in FIG. 1, the present invention according to traveling wave detection apparatus 10 is configured to measure and image traveling waves at surface 14 of a material such as object of interest 12. The traveling waves are measured and imaged for the purpose of characterizing material properties by monitoring the propagation characteristics of the traveling waves. The traveling waves are imaged using a photorefractive vibration spectral analysis technique to provide images of the surface displacement of a traveling wave along surface 14 of object of interest 12.

More particularly, a vibrating medium such as a surface 14 on object of interest 12 vibrates at a given frequency when driven by an excitation mechanism that generates an externally applied vibration force. One technique for vibrating a specimen such as object of interest 12 is to apply an excitation force via an amplitude modulated ultrasonic traveling wave generation laser 54. Laser 54, or some other synchronized generation source, is configured to induce vibrational modes in object of interest 12. Another excitation technique is to apply a wide bandwidth piezoelectric transducer that is air coupled or is placed in contact with the specimen, or object of interest 12.

A synchronized modulation mechanism, comprising a photorefractive vibration spectral analysis apparatus, provides images of the surface displacement of the generated traveling waves along surface 14. Such apparatus comprises an emitter of coherent light 16, in one configuration a laser such as an Argon laser. Laser 16 emits light having a substantially fixed wavelength and a predetermined luminous output. For example, a luminous output of 514 nanometers and 200 mW can be emitted by laser 16.

Light emitter, or laser, 16 generates light that is transmitted along a first beam path generally indicated by reference numeral 20. A beam splitter 18 constructed of any conventional design well known in the art is positioned and oriented along first beam path 20 so as to generate object and reference beams 22 and 24, respectively. Object beam 22 and reference beam 24 are combined within a photorefractive substance 26 so as to provide a photorefractive vibration spectral analyzer.

Object beam 22, which travels along first beam path 20, has two courses. Such first beam path 20 includes a first course 28 and a second course 30. Reference beam 24, which travels along a second beam path 32, also has two courses. Such second beam path 32 includes a first course 34 and a second course 36. Emitter 16 is configured to produce two or more wavefronts, one wavefront comprising object beam 22 and another wavefront comprising reference beam 24. It is understood that object beam 22 comprises an object wavefront that is modulated by a vibrating medium, or surface 14.

As shown in FIG. 1, beam splitter 18 and a beam expander 42 are interposed along first course 28. Beam splitter 18 is formed from a conventional design presently understood in the art. Beam splitter 18 is located to split a beam of light emitted from light emitter 16 so as to form first beam path 20 and second beam path 32. First course 28 of first beam path 20 extends between light emitter 16 and vibrating specimen 12. First course 34 of second beam path 32 extends between light emitter 16 and beam splitter 18. Hence, first beam path 20 and second beam path 32 are separated by beam splitter 18. First course 34 of second beam path 32 is reflected via beam splitter 18 to form second course 36.

Accordingly, first beam path 20 provides for an object beam 22, and second beam path 30 provides for a reference beam 24. A third beam path 38 provides for an output beam 40 produced from a two-wave mixing process of this invention that is discriminated via anisotropic self-diffraction, with polarization rotation, which produces a rotation in the linear polarization of the diffracted reference beam with respect to that of the transmitted object beam. Optionally, anisotropic self-diffraction can be implemented without polarization rotation.

Beam expander 42 is interposed along first course 28 and is operative to expand object beam 22 prior to being directed onto surface 14 of the vibrating specimen of the object of interest 12. Object of interest 12 reflects the expanded object beam 22 extending along first course 28 from a diffusely reflecting surface of the specimen undergoing continuous vibration to second course 30. Beam expander 42 is formed from a conventional design presently understood in the art.

As shown in FIG. 1, object of interest 12 is located in a predetermined location to reflect object beam 22, traveling along first course 28, in the direction of second course 30. The expanded object beam 22 travels along the second course 30, reflects off vibrating surface 14, and travels along the second course 30. Also interposed along second course 30 is a collection lens 44 and a polarizer 46 which cooperate to focus and discriminate image light scattered from the specimen into a sensing media comprising a photorefractive substance, in one form a photorefractive substance, or crystal, 26. The sensing media of photorefractive substance 26 is configured to receive in combination object beam 22 and reference beam 24. Object beam 22 and reference beam 24 are received in the form of a reflected object wavefront and a modulated beam, such as a modulated reference wavefront.

According to one implementation, collection lens 44 comprises an optical lens configured to focus object beam 22, along second course 30, onto a desired location of photorefractive crystal 26. Accordingly, collection lens 44 is positioned to image light scattered from surface 14 of specimen 12 in the photorefractive crystal 26. Collection lens 44 is formed from a conventional design presently understood in the art.

According to one implementation, polarizer 46 comprises an input high extinction ratio polarizer configured to select, or discriminate, one polarization component of the object beam 22 reflected from surface 14 of specimen 12. Polarizer 46 is formed from a conventional design presently understood in the art. Polarizer 46 is configured to select one component of the object beam 22 reflected from specimen 12.

Upon being reflected off surface 14 of vibrating object of interest 12, object beam 22 has been impressed with information defining the given vibration displacement amplitude and vibration phase of object 12. Such object beam 22 is combined to interfere with reference beam 24 within photorefractive substance 26, here a bismuth silicon oxide (BSO) crystal, via a two-wave anisotropic self-diffraction, with or without polarization rotation, approach. It is understood that object and reference beams are mutually coherent so as to interfere within the photorefractive material. An electro-optic phase modulator 43 operates on reference beam 24 to produce a modulated reference beam. The phase modulated reference beam and the reflected object beam 22 interfere within and pass through photorefractive substance 26 to create a space charge field having a magnitude which is directly proportional to the vibration displacement amplitude of object 12 and a cosine function of the vibration phase, for small amplitudes. The space charge field produces an index of refraction grating by the electro-optic effect which contains information on the vibration state of the surface.

It is understood that photorefractive substance 26 has a given response time wherein the induced grating within substance 26 passes reflected object beam 22 and reference beam 24. Object beam 22 and reference beam 24 interfere within photorefractive substance 26 to create a space charge field and resulting induced grating which develop within the response time of the photorefractive substance. Object beam 22 is reflected off vibrating object of interest 12, having a vibration displacement amplitude and a vibration phase. The photorefractive substance 26 passes the reflected object beam 22 and the reference beam 24 such that their interference therein creates a space charge field induced grating having a diffraction efficiency which is directly proportional to the vibration displacement amplitude and a cosine function of the vibration phase, for small amplitudes.

Accordingly, photorefractive substance 26 comprises a sensing media having a detection resolution within a limited bandwidth, wherein reference beam 24 is modulated at a frequency such that a difference frequency between object beam 22 and reference beam 24 is within a response range of the sensing media. As such, the sensing media produces an image of a vibrating surface 14 having an output intensity that is substantially linear with small physical variations of vibrating surface 14.

In practice, calibration measurements have been implemented using a piezoelectric translation mirror. The excited vibrational modes of the specimen determine the frequency-dependent displacement amplitude of the surface, which is transferred into phase modulation $\delta_1$ of the object beam. The reference beam is phase modulated by an electro-optic modulator 43 at a fixed modulation depth $\delta_2$. Modulated beams are then combined and interfere inside a bismuth silicon oxide (BSO) photorefractive crystal 26 at an external angle between the beams of about 45 degrees. A two-wave mixing configuration was used for read-out of the photorefractive index grating produced within crystal 26.

A measurement device, or imaging device, in the form of a photodetector such as a (CCD) camera 52, is used to detect a forward diffracted beam that has been enhanced via the gain of the two-wave mixing process. Prior to detecting such forward diffracted beam, an analyzer (or polarizer) 48 and an imaging lens 50 discriminate and focus such forward diffracted beam.

According to one implementation, measurement device 52 comprises a charge coupled device (CCD) camera or other imaging device operable to image the forward diffracted beam. Device 52 can include a display screen for viewing images.

Polarizer 48 and imaging lens 50 are constructed in the same manner as polarizer 46 and collection lens 44, respectively. More particularly, polarizer 48 comprises an output high extinction ratio polarizer configured to select, or discriminate (using an anisotropic self-diffraction, with or without polarization rotation, property), the diffracted wavefront at the output of the crystal 26 from the forward transmitted object wave. Polarizer 48 is formed from a conventional design presently understood in the art. Polarizer 48 is configured to select one component of the diffracted wavefront. Likewise, imaging lens 50 comprises an optical lens configured to focus the diffracted wavefront passed by photorefractive substance 26 onto CCD camera 52 where it is detected. Accordingly, collection lens 44 is positioned to image light diffracted from substance 26 onto detector 52. Collection lens 44 is formed from a conventional design presently understood in the art.

Also shown in FIG. 1, an electro-optic modulator 43 is interposed along second course 36. Modulator 43 is configured to modulate reference beam 24. Light from reference beam 24, traveling along second course 36, is acted upon by an electro-optic modulator (EOM) or other suitable phase modulator 43 of conventional design as is presently understood in the art. Electro-optic phase modulator 43 is located to modulate the reference beam at a substantially fixed modulation depth, as will be discussed in greater detail below. Reference beam 24, which has been acted upon by the electro-optic phase modulator 42, emerges as a modulated reference beam which is directed at an angle to photorefractive substance, or crystal, 26.

Photorefractive substance 26 is positioned at a given location along both the second course 30 of first beam path 20 and the second course 36 of the second beam path 32, where the first and second beam paths 20 and 32 come together. According to one aspect of the invention, photorefractive substance 26 comprises a crystal of bismuth silicon oxide capable of generating a photorefractive grating at a predetermined Bragg angle. Other photorefractive substances can also be employed with equal success, according to other aspects of the invention.

Modulated reference beam 24 is interfered with object beam 22, inside of a bismuth silicon oxide crystal 26 at an external angle of about 45 degrees. This optical interference creates a space charge field which develops, within the response time of same, an index of refraction grating. The index of refraction grating produces, through two-wave mixing, output beam 40 extending along third beam path 38. The resulting output beam 40 is directed at a photodetector 52 in the form of a CCD camera where it is detected and characterized via graphical representation as a graphic image on a display (not shown).

CCD camera 52 produces a signal that is coupled via a communication line to deliver a graphic image for viewing by a user on a graphics display. Optionally, such graphic image can be delivered to a computer containing image processing software capable of selectively acquiring and storing desired images.

As shown in FIG. 1, a two-wave mixing optical lock-in modulation scheme is implemented via vibration detection and imaging apparatus 10 wherein anisotropic self-diffraction is employed so as to provide improved optical throughput and selectivity. In one case, the anisotropic self-diffraction can be implemented with polarization rotation. In another case, the anisotropic self-diffraction can be implemented without polarization rotation. In order to achieve maximum sensitivity, a significant component of the directly transmitted object beam 22 must be discriminated against.

Two-wave mixing comprises use of an optically active photorefractive material or substance 26, such as bismuth silicon oxide (BSO) crystal, which enables discrimination via anisotropic self-diffraction. Anisotropic self-diffraction, which is understood in the optics art, produces a rotation in the linear polarization of the diffracted reference beam 24 with respect to that of the transmitted object beam 22.

When implementing two-wave mixing according to the apparatus 10 of FIG. 1, the thickness of photorefractive crystal (PRC) 26 can be adjusted to enhance sensitivity by discriminating against the transmitted object beam. The thickness of crystal 26 is adjusted in order to achieve a 90-degree polarization shift between diffracted reference beam 24 and transmitted object beam 22. Such polarization shift enables elimination of the directly transmitted object beam 22 via the use of high extinction ratio polarizers 46 and 48.

As a result of discriminating the transmitted object beam, the diffracted reference beam is imparted with an intensity that is dependent on the vibration displacement and is temporally modulated at the frequency difference between the mixing waves. Such temporal modulation is analogous to the four-wave mixing case disclosed in Applicant's co-pending U.S. patent application Ser. No. 08/787,073. Also according to the four-wave mixing case, the two-wave mixing case requires that only the output intensity of output beam 40 need be measured in order to obtain both the vibration amplitude and the phase. Hence, direct imaging can be carried out at intensity levels suitable for industrial applications.

It is understood that the photodetector signal can be processed with a conventional electrical lock-in method that is set to a bandwidth of about 1 Hz. Details of a lock-in model can be developed using one-dimensional plane wave coupled mode analysis. Such details are understood in the art and have been described in Applicant's Provisional Application Ser. No. 60/039,171, filed on Feb. 26, 1997, and incorporated herein by reference.

According to such construction, the photorefractive crystal 26 acts as a mixing and low-pass filtering element that provides the benefits of lock-in detection. Hence, the space charge field responds only to slowly varying phase modulations occurring within the material response time constant, allowing only terms existing around the difference frequency to have a significant effect on the quantity. The space charge field modulates the local refractive index through the linear electro-optic effect. Such effect creates a diffraction grating within the crystal that contains the low-frequency phase information that is desired. Several methods can be used to read out the diffraction grating, including the four-wave mixing technique disclosed in Applicant's pending U.S. patent application Ser. No. 08/787,073, filed on Jan. 22, 1997, as well as the two-wave mixing application with polarization selection as taught herein. Furthermore, the electrical measurement can be implemented through conduction of photo excited carriers. Even furthermore, isotropic self-diffraction within the photorefractive material can be used to discern the vibration signal within an output beam.

One suitable experimental setup for vibration detection and imaging apparatus 10 of FIG. 1 using self-diffraction entails light emitter 16 comprising an Argon laser source at 514 nm, 500 mW. Such laser source is split into two legs, object beam 22 and reference beam 24. Also according to such setup, object of interest 12 comprises a piece of sheet material. Object beam 22 is expanded and reflected from a diffusely reflecting surface 14 of the specimen, or edge-clamped sheet material, 12 while it is is forced to undergo continuous vibration.

Pursuant to such above-described experimental setup, the clamped sheet material was excited into vibration by a wideband piezoelectric transducer placed in contact with a center point of the sheet material. Reflected light scattered from the specimen was then imaged onto a plane in the photorefractive crystal 26 via collection lens 44. Such modulated reference beam was also expanded and imaged within the photorefractive crystal 26 to produce a volume holographic grating having an external angle between the object and reference beams 22 and 24 of about 45 degrees. Photorefractive crystal 26 was sized 10 mm by 10 mm by 2.25 mm, with the crystal being cut along the <001> and <110> directions.

As a result of the response time, it is understood that the photorefractive substance 26 has a given cut-off frequency, and that the modulated reference beam 24 has a frequency difference which is less than about the cut-off frequency of photorefractive substance 44. Furthermore, the measurement device, or photodetector, 52 is positioned so as to measure both the vibration amplitude and the phase of the object of interest 12.

In a preferred embodiment of the invention 10, object beam 22, traveling along second course 30, has a given frequency, and the modulated reference beam 24, traveling along second course 36, has a frequency which is offset by an amount of about 25 Hz from the given frequency of the reflected object beam. In the case where photorefractive substance 26 comprises a material such as bismuth silicon oxide, the cut-off frequency of such bismuth silicon oxide is about 70 Hz, and the response time is 1. about 0.015 seconds.

In operation, the excited vibrational modes of the object of interest 12 determine the frequency-dependent displacement amplitude of the sample surface 14 which, in turn, is transferred into the phase modulation of the object beam 22 which travels along second course 30. As was previously discussed, reference beam 24 is phase modulated by the electro-optic phase modulator 43 at a fixed modulation depth.

The modulated reference beam and the reflected object beam are then combined and interfere inside a photorefractive substance, such as bismuth silicon oxide 26, at an external angle of about 45 degrees. The interference generates a space charge field distribution that mirrors the interference pattern. In the present invention 10, a two-wave mixing configuration is used for demodulation of the photorefractive interference grating produced within the photorefractive substance 26. The reference beam 24 is directed into the photorefractive substance 26 where it interferes with the expanded, reflected, focused (via lens 44) and polarized (via polarizer 46) object beam 22. The resulting output beam 40 moves along the third beam path 38 and is then analyzed at polarizer 48 and focused by imaging lens 50 and presented at the photodetector of CCD camera 52.

Photorefractive substance 26 acts as a mixing and low pass filtering element. The measured signal intensity, which can be calculated for each of these modes, is a time-dependent photorefractive first order response theory in the single grating approximation. The results of such calculation, which retains only the most dominant terms, is described by the following equation and, wherein $\delta_1$ equals the phase modulation of the object beam; $\delta_2$ is the fixed modulation depth of modulated reference beam 24; $\tau$ is the photorefractive time constant and $\Omega=\omega_2-\omega_1$; $\tan(\Psi)=\Omega\tau$; and ($\psi_1-\psi_2$) is the relative phase difference between the vibrating specimen surface and the electro-optic frequency modulator 43:

$$I(t) \sim \frac{\cos(\Omega t + \Psi - (\varphi_1 - \varphi_2))}{J_0(\delta_1)J_1(\delta_1)J_0(\delta_2)J_1(\delta_2)\sqrt{1+\Omega^2\tau^2}}$$

According to the invention 10, the signal excitation and reference modulations are synchronized, and the measurement is shifted to a fixed offset frequency ($\Omega<1/\tau$). In this mode of operation, the signal excitation and reference modulation are maintained coherent at a fixed frequency difference ($\Omega/2\pi$). This mode of operation ensures that the AC, or beat component of the signal beam intensity is always present at the photodetector 52. By utilizing this approach, both the vibration amplitude, and phase of the vibrating object of interest 12 can be directly measured by the light intensity at the photodetector 52. It should be recognized that this method discriminates against static or time varying phase shifts outside the given bandwidth and can be extended to all vibration frequencies above the reciprocal of the photorefractive response time (67 Hz for BSO).

In summary, the first preferred embodiment depicted in FIG. 1 describes an apparatus and method for imaging vibrations comprising traveling waves across an object surface by collecting laser light that is scattered from the surface. By mixing the scattered light from the object with a modulated reference beam inside a photorefractive material, an optical lock-in detection technique is achieved that provides high noise immunity through narrow bandwidth signal processing. Such an apparatus and method achieves sub-nanometer surface displacement sensitivity in a is manner that allows spectral analysis of traveling waves within structures or materials. The novelty of this apparatus and method includes using a synchronized excitation scheme and modulation scheme. Additionally, novelty includes the employment of synchronous optical detection in a manner that provides an image of traveling waves propagating over the surface of a vibrating specimen. Furthermore, the novelty includes an implementation that utilizes the optical interference inside the photorefractive material to provide an output beam intensity that is substantially directly proportional to the vibration displacement amplitude over the specimen surface. Hence, the need for producing optical interference at the image plane surface is eliminated. In the first embodiment, the image plane surface comprises a charge-coupled device camera.

Figure 2:
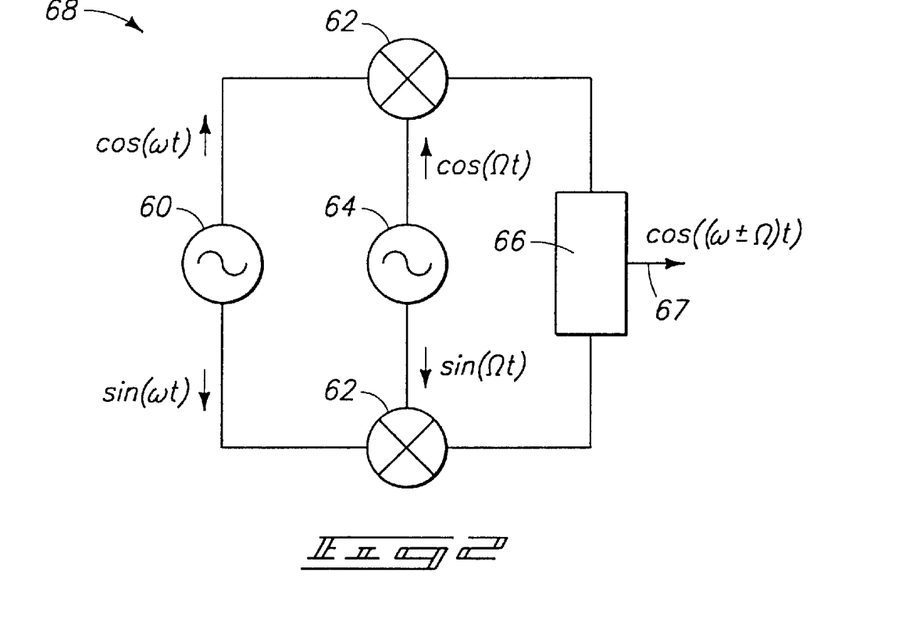
FIG. 2 is a simplified diagrammatic view of a preferred single sideband generator used with the apparatus of FIG. 1 and configured via single sideband excitation electronics.

FIG. 2 illustrates source electronics 68 comprising single sideband excitation source electronics. According to one construction, source electronics 68 include an excitation signal generator, a signal mixer 62, an offset signal generator 64, and a signal combiner 66. Source electronics 68 contains signal generators 60 and 64, each comprising an oscillator capable of simultaneously generating both sine and cosine outputs. Excitation signal generator 60 comprises a sinewave oscillator configured at an arbitrary frequency ($\omega/2\pi>67$ Hz). Offset signal it generator 64 comprises a sinewave oscillator configured at a fixed low frequency ($\Omega/2\pi\sim25$ Hz). Accordingly, a single sideband sinewave output is required to be produced at $\omega+\Omega$, or $\omega-\Omega$, but not at both. All of such outputs are coupled into a 50-ohm load.

According to one construction, source electronics 68 is constructed from components produced by Minicircuits, Inc., capable of being implemented at high frequencies. Optionally, such source electronics 68 can be configured for low frequency operation using other electronic sources.

Source electronics 68 of FIG. 2 can also be shown implemented as generator 60 and 64, in FIG. 1. Accordingly, mixer 62 is implemented in conjunction with generator 60 and 64 so as to impart a synchronized generation source, or a reference modulation synchronized with the vibration input signal, via laser 54, along excitation beam 58, and against target surface 14.

Figure 3:
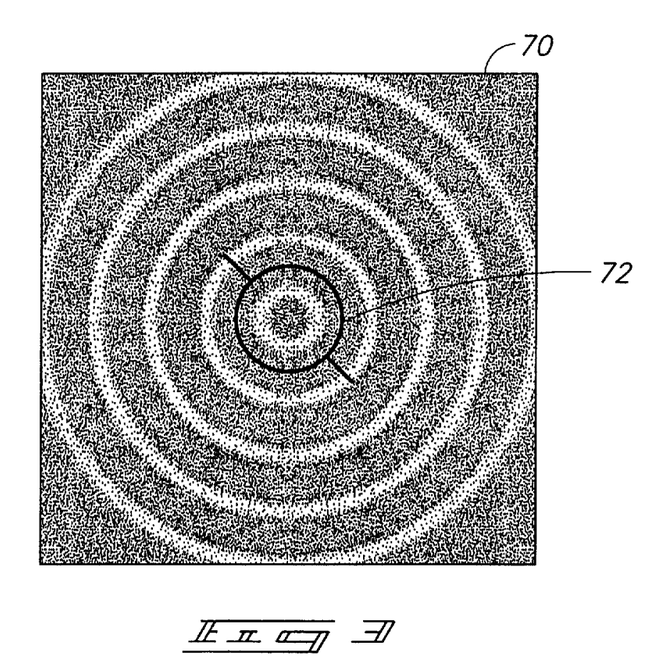
FIG. 3 is a simplified image representation of recorded traveling wave displacement amplitudes from a substantially isotropic sheet material, here vellum or mylar, as excited by a contact point vibrating source.

FIG. 3 illustrates a pattern of traveling wave displacement amplitudes from sheet vellum 9 (or mylar) material 70. A dark circle marker 72 is printed onto material 70 to enable visualization of such traveling waves to determine orientation and variations from circular propagation of such waves. Marker 72 forms a circle and a pair of radially extending arms positioned at a 45 degree clockwise angle from horizontal. Such mylar sheet material was excited by a contact point vibrating source, such as a piezoelectric transducer, positioned at the center of marker 72.

Comparison between the circular portion of marker 72 and the it surrounding traveling waves enables a comparison to determine if wave velocity varies with direction, or orientation. The arms of marker 72 enable comparison of directional orientation where wave velocity variations generate elliptical traveling waves. Such directional orientation is used to determine material anisotropic characteristics. It is understood that the orientation of arms on marker 72 is not important. However, such orientation should be correlated with the orientation of processing machines/steps used to produce a material. For example, where the material is produced on a forming line, the direction of travel for a sheet should be noted such that marker 72 is placed relative to the direction of travel during sheet formation. Marker 72 is centered over the point of origination for the traveling waves. Hence, observation of anisotropic characteristics can be noted relative to marker 72.

A visual observation of FIG. 3 indicates Vellum is a substantially isotropic material since the traveling waves radiate outwardly in all directions with substantially the same wave speed. Such substantially same wave speed is observed to produce a circular wave pattern. Analysis of the traveling wave data can be conducted to obtain wave speeds in all directions from marker 72.

Figure 4:
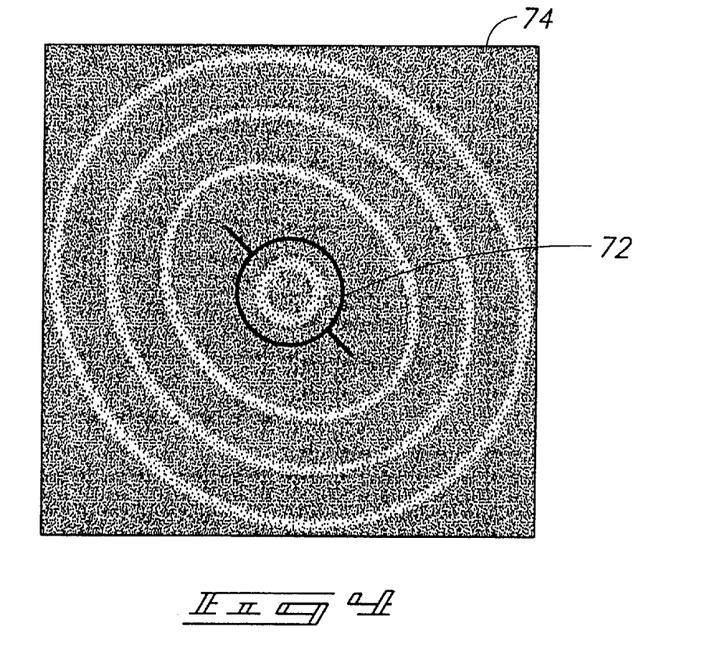
FIG. 4 is a simplified image representation of recorded traveling wave displacement amplitudes from an anisotropic sheet material, here paper, as excited by a contact point vibrating source.

A visual observation of FIG. 4 illustrates a pattern of traveling wave displacement amplitudes from sheet paper material 74. Marker 72 is printed onto paper material 74, in the same manner as on the Vellum of FIG. 3, to enable visualization and characterization of traveling waves. Hence, the orientation and variation of such traveling waves extending from a point of origin centered in marker 72 can be determined. Material property of paper material 74 can be determined by comparing marker 72 with traveling wave propagation about marker 72.

FIG. 4 shows traveling waves having a quasi-elliptical wave propagation pattern that is characteristic of a material having anisotropic material properties. The major axis of the ellipse is oriented along the axis of the arms on marker 72. Furthermore, the elliptical traveling wave pattern can be clearly seen.

Analysis of such traveling wave pattern; for example, by measuring the travel distance of one wave at each of several angular positions about the point of origin, can be used to determine wave velocities for specific directions in a material. Hence, anisotropic patterns can be characterized and correlated with the process used to manufacture the material. Accordingly, determinations can be made on the suitability of material characteristics. Additionally, such determinations can be used to monitor and modify a material manufacturing process so as to improve the uniformity of a material, and reduce anisotropic characteristics. Even further, the material can be graded so as to orient the material such that the material properties are oriented according to a desired configuration. In summary, the monitoring of such information is valuable for industries that produce such materials.

In addition, analysis of the traveling wave can be performed by either optical or post processing to implement mathematical transforms, such as the Fourier transform, to determine material properties. The transformed data provides an image of the distribution of spatial frequencies (i.e., wavelengths) in all directions simultaneously. Hence, for instance, the wavelength of the traveling wave and the phase velocity is quantitatively determined in all directions at once from the image. Optical implementation would involve the use of lenses or other optical components as transform devices which could produce an all optical device.

Figure 5:
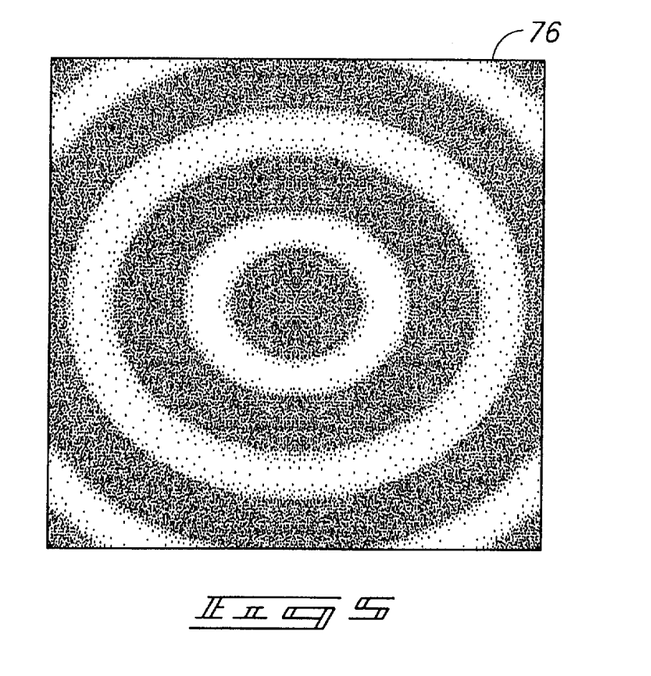
FIG. 5 is a computer generated image for a calculated theoretical waveshape of a flexural wave in a thin plate of anisotropic material that has been excited from a center location with an oscillating vertical displacement.
Figure 6:
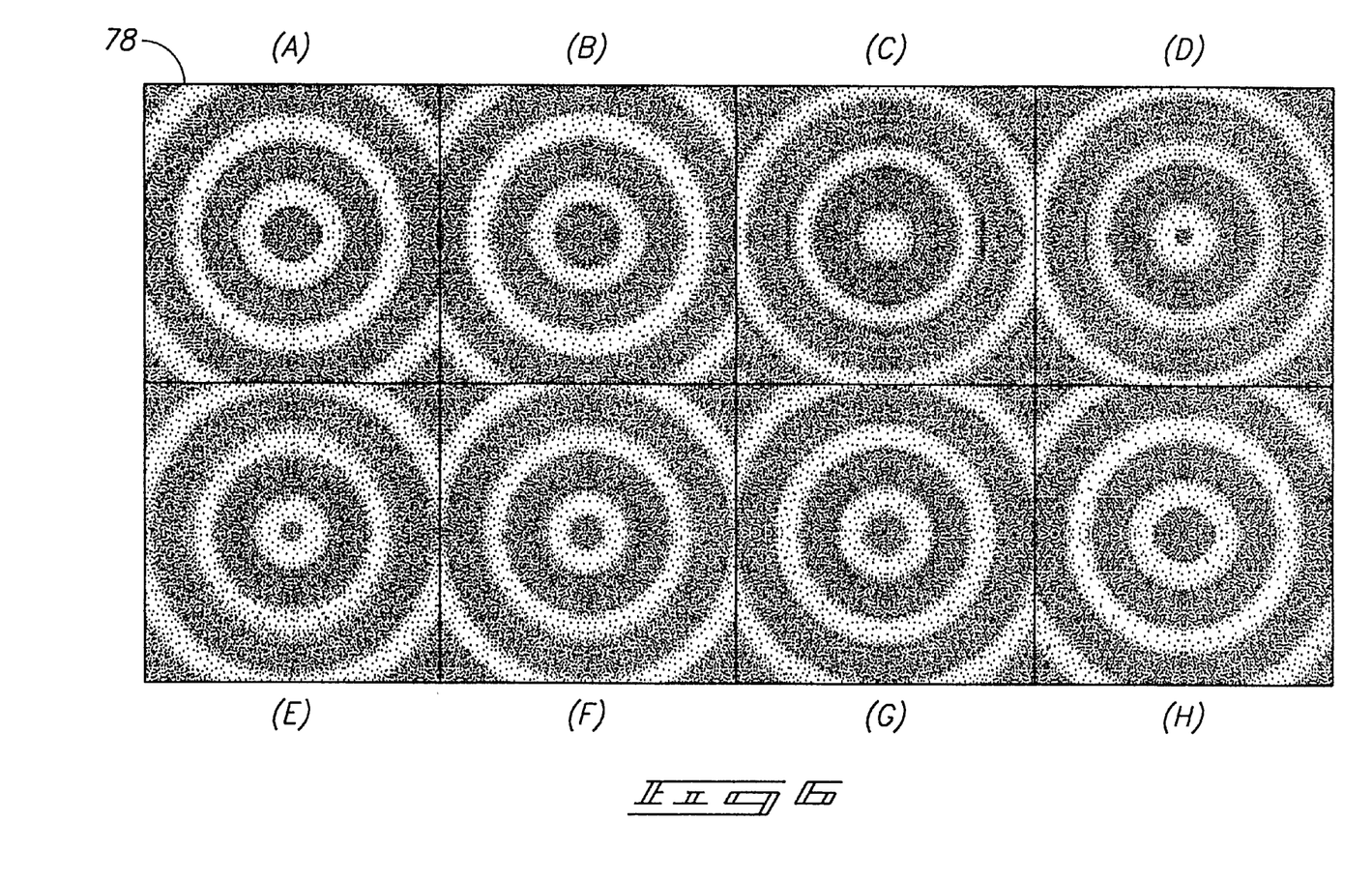
FIGS. 6A–H are individual consecutive frames of a traveling wave emerging from the center of a mostly isotropic stainless steel sheet.
Figure 7:
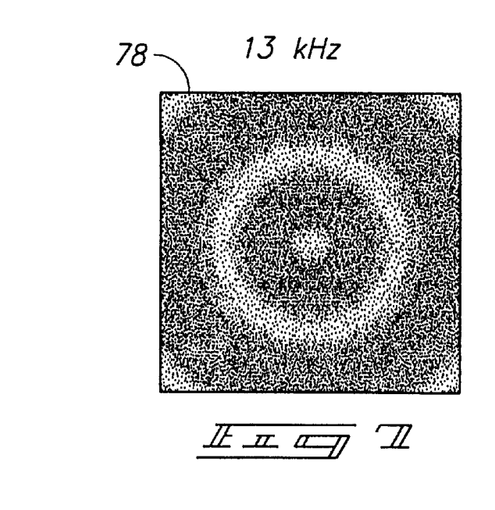
FIG. 7 is a simplified image representation of a traveling wave emerging from the center of a mostly isotropic stainless steel sheet vibrating at 13 kHz.
Figure 8:
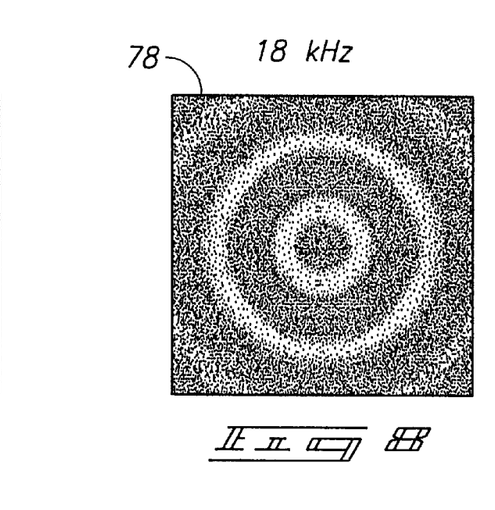
FIG. 8 is a simplified image representation of a traveling wave emerging from the center of a mostly isotropic stainless steel sheet vibrating at 18 kHz.
Figure 9:
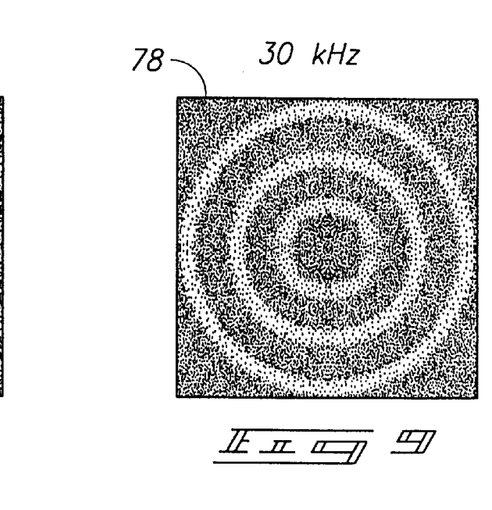
FIG. 9 is a simplified image representation of a traveling wave emerging from the center of a mostly isotropic stainless steel sheet vibrating at 30 kHz.
Figure 10:
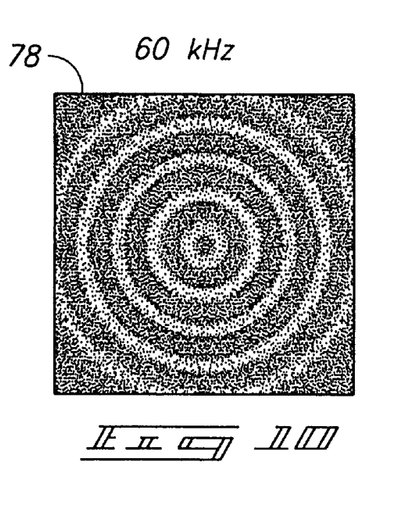
FIG. 10 is a simplified image representation of a traveling wave emerging from the center of a mostly isotropic stainless steel sheet vibrating at 60 kHz.
Figure 11:
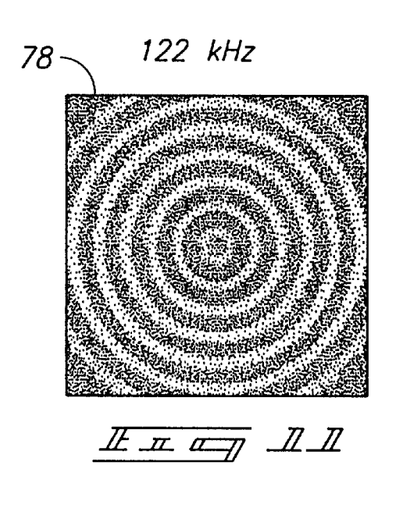
FIG. 11 is a simplified image representation of a traveling wave emerging from the center of a mostly isotropic stainless steel sheet vibrating at 122 kHz.
Figure 12:
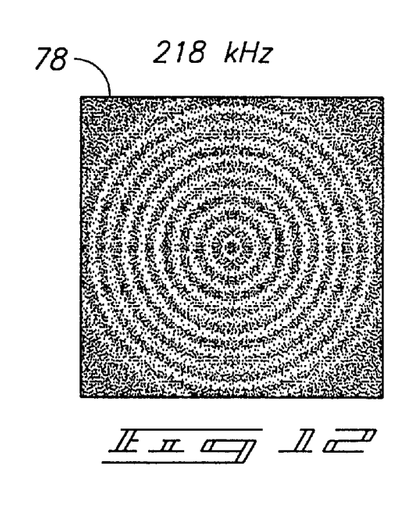
FIG. 12 is a simplified image representation of a traveling wave emerging from the center of a mostly isotropic stainless steel sheet vibrating at 218 kHz.

FIG. 5 illustrates a computer-generated image of theoretical traveling waves for a flexural wave formed in a thin plate that is excited from a center location. The vertical displacement, perpendicular to the image plane, was modeled to oscillate over time. The material was modeled to have anisotropic material properties. As seen in FIG. 5, the elliptical waves have a major axis that extends in a horizontal direction.

FIGS. 6A–H illustrate eight individual consecutive images corresponding to a traveling wave emerging from the center of a mostly isotropic stainless steel sheet material 78. Sheet material 78 comprises a stainless steel metal sheet of 0.005 inches in thickness. Propagation of the traveling waves can be viewed consecutively from FIG. 6A to FIG. 6H, showing movement of the traveling wave outward from a center origination point. A center spot, located at the center point, alternatingly enlarges, then forms a new small spot from the center point which likewise enlarges. An imaging device, such as a charge coupled device (CCD) camera 52 (see FIG. 1) can be used to capture each image. If the time between images is sufficiently short, such images can be displayed on an output device or display screen. Such display creates a visual moving impression of the wave traveling in real-time which can be used to recognize waves in an image of a vibrating material or plate.

FIGS. 7–12 show images of traveling waves in a plate of stainless steel material 78 generated at frequencies of 13, 18, 30, 60, 122 and 218 kHz, respectively. Material 78 is the same material depicted in the image of FIG. 6, having a thickness of 0.005 inches and comprising a mostly isotropic stainless steel sheet, or plate. Images of the resulting traveling waves at different frequencies show a decrease in wavelength of the wave as the frequency is increased. Such images can be used to quantify the wavelength and the phase velocity of such traveling waves simply by measuring the distance between adjacent waves. Additionally, material properties such as elastic constant, density, anisotropy, and thickness can be determined from the phase velocity values.

Figure 13:
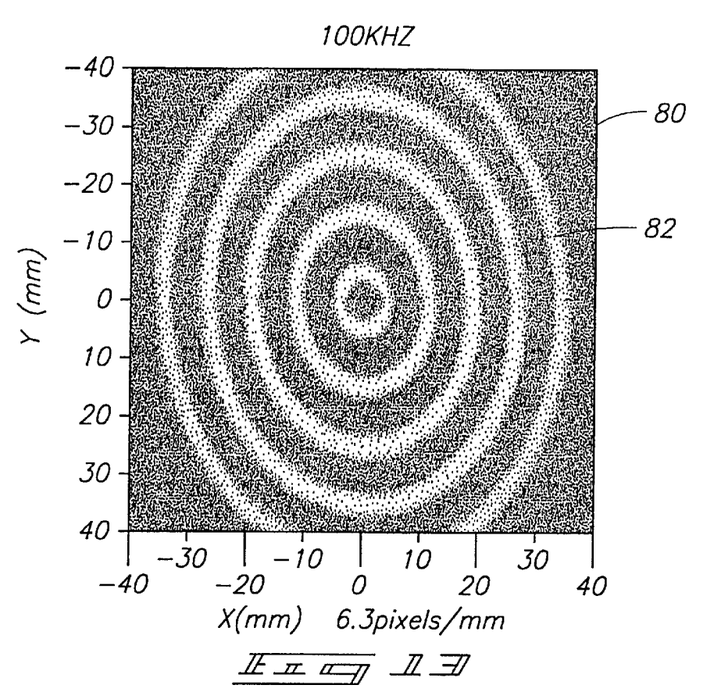
FIG. 13 is a simplified image representation of a traveling wave emerging from the center of an anisotropic sheet of copy paper having an orientation at an angle of about 5 degrees counterclockwise from the vertical at 100 kHz.

FIG. 13 illustrates an image of a traveling wave formed in paper 19 at 100 kHz. Typical copy paper is anisotropic, resulting from the manner in which such paper is processed. For example, a paper slurry is typically arranged on a moving continuous line, with rolling and heating operations imparting directional properties to the final, finished paper. The sample of paper tested and illustrated in FIG. 13 clearly depicts an anisotropic property oriented at an angle of about 5 degrees counterclockwise from the vertical axis. Such angle forms the major axis of an ellipse, indicating that the traveling wave moves at the greatest velocity in a direction extending along such axis. Concomitantly, the perpendicular minor axis indicates that the traveling wave moves at the slowest velocity along such perpendicular minor axis.

Figure 14:
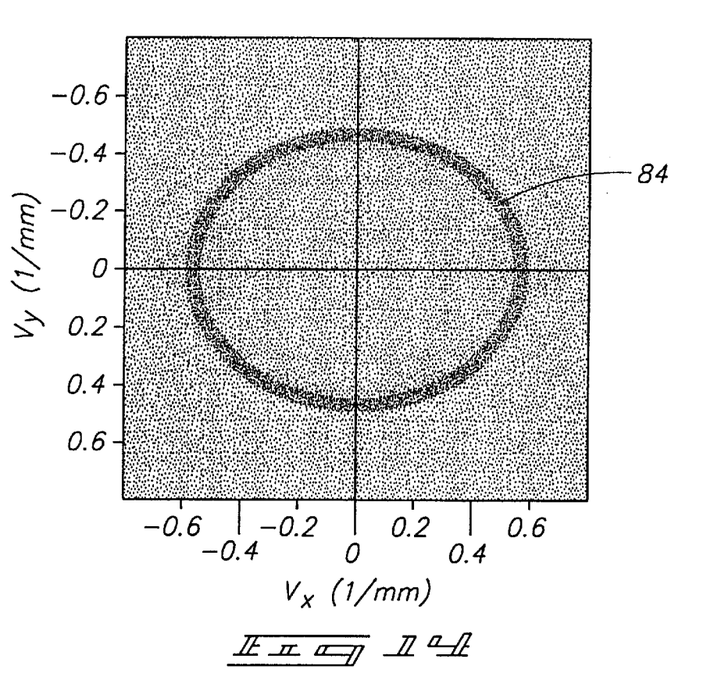
FIG. 14 is a computer generated image of a Fourier domain transformation of a spatial image for a traveling wave in copy paper at 100 kHz as depicted in FIG. 13.

FIG. 14 illustrates a Fourier domain transformation of spatial traveling wave images such as that depicted in FIG. 13. Such Fourier domain transformation contains embedded information about the traveling wave moving through the paper at 100 kHz. A resulting plot for a central quasi-elliptical curve is a direct result of the traveling nature of the wave, and shows directly the different wavelengths for the wave in different directions. From such data, the wave speeds in all directions, elastic constants, anisotropy, and orientations with respect to the machine (drawing) direction are immediately known.

It is further understood that any of a number of modulation schemes can be utilized with this invention relative to a reference image. Accordingly, an image can be derived directly from an object as a reference image. Alternative ways of modulating such a reference image include phase modulation, amplitude modulation, polarization, and spatial or temporal modulation of such reference image. Furthermore, the rate of change of interference patterns within a sensing media can be maintained within the response capability of the sensing media, irrespective of the object image and reference image modulations. Such characteristic allows the sweeping of such modulations throughout a large spectral range so as to provide imaging spectral analysis of an object's vibrations without exceeding the response capabilities of a sensing media, or medium. According to such implementations, the intensity of the output image at every point is substantially linearly related to the vibration amplitude at the corresponding point of the vibrating medium, for small motions, or low amplitudes.

According to the methods of this invention, periodic physical variations in an object can be measured and imaged, including but not limited to sonic or ultrasonic vibrations, where the rate of detected signal modulation is maintained within a fixed bandwidth by suitable modulation control of the sensing wavefronts or beams. Accordingly, the above-described implementations each include two or more separate waves that are sufficiently mutually coherent to produce interference. The interfering separate waves are superimposed or mixed within a suitable sensing media.

An imaging device, such as an object beam collection lens, is used to create an image of the object on or within the sensing media in order to provide a means for imaging the sensed data. At least one of the beams, or wavefronts, is modulated by interacting with an object that is undergoing some oscillatory change in physical condition.

Currently, a reference beam is synchronously, or asynchronously, modulated in a similar manner. In certain cases, such reference beam is imparted with a fixed offset. The sensing media then undergoes a detectable modification in its properties by responding to the interference pattern that is generated by mixing the object and reference beams. The interference pattern then generates an image of the vibrating medium.

The difference in modulation rate between the reference and object beams is controlled and fixed such that the beams produce an interference pattern whose spatial distribution in the sensing media is varying at a rate within the response time of the media. Hence, the sensing media always records a signal within its bandwidth, independent of the actual modulation rate of the object or reference beams.

Finally, as the sensing media contains an image of the entire visible object, the resulting data consists of a full field of two-dimensional image of the distribution of the physical variation in the object that is being measured. Accordingly, the sensing media produces an output beam indicative of the vibration of the object. In certain implementations, an image is produced inside the sensing media.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method for imaging traveling waves extending through a medium, comprising:
   providing a sensing media having a detection resolution within a limited bandwidth;
   providing a medium;
   providing an object wavefront and a reference wavefront;
   vibrating the medium;
   modulating the object wavefront by interacting the object wavefront with the vibrating medium;
   modulating the reference wavefront in synchronization with the vibrating medium such that a difference frequency between the object wavefront and the reference wavefront is within a response range of the sensing media;
   combining the modulated object wavefront and the reference wavefront in association with the sensing media to interfere, demodulate an interference product of the modulated object wavefront and modulated reference wavefront, and produce simultaneous measurements distributed over the object so as to produce an image of a traveling wave in the vibrating medium having an output intensity that is substantially linear with small physical variations within the vibrating medium and is substantially proportional to a traveling wave displacement amplitude simultaneously over the medium; and
   detecting a traveling wave image associated with the vibrating medium.

2. The method in accordance with claim 1 wherein the object beam and the reference beam are coherent.

3. The method in accordance with claim 1 wherein the vibrating medium comprises a solid.

4. The method in accordance with claim 1 wherein the vibrating medium comprises a liquid.

5. The method in accordance with claim 1 wherein the vibrating medium comprises a gas.

6. The method in accordance with claim 1 wherein the medium comprises an object having a surface, and the step of detecting the traveling wave image comprises generating a spatial mapping of a traveling elastic wave propagating along the surface of the object or through the object.

7. The method in accordance with claim 1 wherein the sensing media comprises a photorefractive substance, and the photorefractive substance records an interference pattern.

8. The method in accordance with claim 7 wherein the interference pattern has a rate of change within the response capability of the photorefractive substance.

9. The method in accordance with claim 7 wherein the interference pattern has a rate of change independent of the respective modulation frequencies for the object wavefront and the reference wavefront.

10. The method in accordance with claim 1 wherein the object beam interacts with the medium through which or on which the traveling wave is propagating.

11. The method in accordance with claim 1 wherein the sensing media comprises a photorefractive substance, and the step of combining the modulated reference wavefront and the modulated object wavefront comprises interfering the reference wavefront and the object wavefront within the photorefractive substance so as to generate a grating producing an optically detectable image indicative of traveling waves present within the vibration medium.

12. A method for characterizing material properties of a medium, comprising:
   providing a photorefractive substance having a detection solution within a limited bandwidth;
   providing a medium;
   vibrating the medium;
   providing an object wavefront and a reference wavefront;
   modulating the object wavefront by reflecting the object wavefront off the vibrating medium;
   modulating the reference wavefront in synchronization with the vibrating medium such that the difference frequency between the modulated object wavefront and the modulated reference wavefront is within the response time of the photoreactive substance;
   combining the modulated object wavefront and the modulated reference wavefront in association with the photorefractive substance to interfere, demodulate an interference product of the modulated object wavefront and modulated reference wavefront and generate a space charge field that characterizes traveling waves distributed over the medium; and
   imaging the traveling waves visa the space charge field and characterizing the imaged traveling waves to determine material properties of the medium that arc correlated with the imaged traveling waves.

13. The method of claim 12 further including providing a reference marker on the medium configured to compare against the traveling waves and operative to enable characterizing of the imaged traveling waves.

14. The method of claim 12 further comprising the step of imparting a polarization shift to discriminate the image of the vibrating medium.

15. The method of claim 12 wherein the step of combining the modulated object beam and the modulated reference beam comprises optically interfering the modulated object beam and the modulated reference beam within the photorefractive material so as to produce an output beam having an intensity that is directly proportional to vibration displacement over the vibrating medium for all vibration frequencies above the photorefractive cutoff frequency.

16. The method of claim 12 wherein the step of imaging the traveling waves comprises optically viewing an output beam diffracted from the space charge field with an optical camera.

17. The method of claim 12 further comprising the step of displaying the detected image on a visual display.

18. The method of claim 12 further comprising the step of determining material properties of the medium by optically generating a Fourier transform of the imaged traveling waves so as to generate an image of spatial frequencies relating to the traveling wave that characterizes material properties of the medium relating to wavelength, wave attenuation, and wave velocity.

19. An apparatus for imaging traveling waves in a medium, comprising:

a vibration excitation source configured to impart traveling waves within a media;

an emitter configured to produce two or more wavefronts, at least one wavefront modulate by a vibrating medium;

a modulator configured to modulate another wavefront in synchronization with the vibrating medium;

a sensing media configured to receive in combination the modulated one wavefront and the another wavefront and having a detection resolution within a limited bandwidth, the another wavefront being modulated at a frequency such that a difference frequency between the one wavefront and the another wavefront is within a response range of the sensing media so as to demodulate and interference product of the modulated object wavefront and modulated reference wavefront, and produce an image of the vibrating medium having an output intensity that is substantially linear with small physical variations within the vibrating medium for all vibration frequencies above the sensing media's response bandwidth; and a detector configured to detect an image of traveling waves in the vibrating medium resulting from interference between the modulated one wavefront and the another wavefront when combined in association with the sensing media.

20. The apparatus of claim 19 wherein the sensing media comprises a photorefractive substance, the one wavefront and the another wavefront interfering within the photorefractive substance to generate a space charge field within the response capability of the photorefractive substance.

21. The apparatus of claim 20 wherein the space charge field generates an image indicative of surface vibration on the vibrating medium.

22. The apparatus of claim 19 wherein the emitter comprises a light emitter, the one wavefront comprises an object wavefront, and the another wavefront comprises a reference wavefront.

23. The apparatus of claim 22 wherein the object wavefront comprise an object beam, and the reference wavefront comprises a reference beam.

24. The apparatus of claim 19 wherein the modulator comprises a phase modulator configured to receive the one reference wavefront.

25. The apparatus of claim 19 wherein the detector comprises an imaging camera.

26. The apparatus of claim 19 wherein the emitter produces a reference beam and an object beam, the reference beam and the object beam each configured to generate an interference pattern within the sensing media representative of a two-dimensional vibrating image of the traveling waves.

27. The apparatus of claim 19 wherein the detector comprises a graphical display configured to display a graphic image of the detected image of the vibrating medium.

28. The apparatus of claim 19 wherein the another wavefront comprises a reference beam, and further comprising a beam expander configured to receive the another wavefront and emit an expanded another wavefront.

29. The apparatus of claim 19 wherein the one wavefront comprises an object beam and the another wavefront comprises a reference beam, and the sensing media comprises a photorefractive substance having self-diffraction properties such that a space charge field is developed within the photorefractive substance associated with an output beam that characterizes the space charge field emitted from the photorefractive substance.

30. A vibration imaging device, comprising:

a vibration excitation source coupled with a medium to generate traveling waves within the medium;

a light it configured to produce an object beam and a reference beam, the object beam including an object wavefront configured to be reflected off a surface of the vibrating medium, a modulator configured to modulate the reference beam;

a sensing media configured to receive and demodulate an interface product of the modulated object wavefront and modulated reference wavefront in combination the reflected object wavefront and the modulated reference beam, the sensing media having a detection resolution within a limited bandwidth, the reference beam being modulated in synchronization with the vibration excitation source and at a frequency such that a difference frequency between the object beam and the reference beam is within a response range of the sensing media so as to produce a full-field image of the traveling waves; and a detector configured to detect the traveling waves as a propagating wavefront.

31. The vibration imaging device of claim 30 wherein the detector is operative to generate an image of the traveling waves capable of characterizing material property characteristics of the medium.

32. The vibration imaging device of claim 30 further comprising a beam splitter associated with the emitter and configured to generate the object beam and the reference beam from a single, common source beam.

* * * * *